US006569983B1

United States Patent
Treybig et al.

(10) Patent No.: US 6,569,983 B1
(45) Date of Patent: May 27, 2003

(54) METHOD AND COMPOSITION FOR RECOVERING HYDROCARBON FLUIDS FROM A SUBTERRANEAN RESERVOIR

(75) Inventors: Duane Treybig, Sugar Land, TX (US); Kin-Tai Chang, Sugar Land, TX (US); Dennis Williams, Houston, TX (US)

(73) Assignee: Ondeo Nalco Energy Services, L.P., Sugarland, TX (US)

( * ) Notice: Subject to any disclaimer, the term of this patent is extended or adjusted under 35 U.S.C. 154(b) by 0 days.

(21) Appl. No.: 10/034,276

(22) Filed: Dec. 20, 2001

(51) Int. Cl.$^7$ .................. C08G 73/02; C08G 59/00; C08G 59/10; C09K 7/02; E21B 33/138
(52) U.S. Cl. .............. 528/102; 528/97; 528/99; 528/104; 528/109; 528/111; 528/121; 528/124; 523/130; 523/131; 166/270; 166/275; 166/295
(58) Field of Search ............... 528/97, 99, 102, 528/111, 104, 121, 124, 109; 166/270, 275, 295; 523/130, 131

(56) References Cited

U.S. PATENT DOCUMENTS

| | | | | |
|---|---|---|---|---|
| 3,349,053 A | | 10/1967 | Ashby ................. 260/29.2 |
| 3,350,325 A | | 10/1967 | Ashby et al. ............. 260/2 |
| 4,189,468 A | * | 2/1980 | Vanlerberghe et al. ...... 424/47 |
| 4,277,581 A | * | 7/1981 | Vanlerberghe et al. ...... 523/105 |
| 4,396,499 A | | 8/1983 | McCoy et al. |
| 4,460,627 A | | 7/1984 | Weaver et al. |
| 4,532,052 A | | 7/1985 | Weaver et al. |
| 4,617,132 A | | 10/1986 | Dalrymple et al. |
| 4,773,482 A | * | 9/1988 | Allison ................. 166/270 |
| 4,817,721 A | * | 4/1989 | Pober .................. 166/295 |
| 5,247,087 A | * | 9/1993 | Rivers ................. 544/357 |
| 5,275,853 A | | 1/1994 | Silvis et al. |
| 5,464,924 A | | 11/1995 | Silvis et al. ............ 528/102 |
| 5,701,956 A | * | 12/1997 | Hardy et al. ............. 166/295 |
| 5,735,349 A | * | 4/1998 | Dawson et al. ........... 166/295 |
| 5,834,078 A | | 11/1998 | Cavitt et al. |
| 5,944,106 A | * | 8/1999 | Dalrymple et al. ......... 166/281 |
| 5,962,093 A | * | 10/1999 | White et al. ............ 428/35.2 |
| 6,156,819 A | * | 12/2000 | Lai et al. ............... 523/130 |
| 6,454,003 B1 | * | 9/2002 | Chang et al. ............ 166/270 |

* cited by examiner

*Primary Examiner*—P. Hampton-Hightower
(74) *Attorney, Agent, or Firm*—Michael B. Martin; Thomas M. Breininger

(57) ABSTRACT

A water-soluble branched polyhydroxyetheramine, wherein the branched polyhydroxyetheramine is prepared by reacting an amine having two reactive hydrogen atoms with a diepoxide to form a polyhydroxyetheramine and then reacting the polyhydroxyetheramine with an N-alkylating agent, an aqueous composition comprising the branched polyhydroxyetheramine and use of the branched polyhydroxyetheramine to modify the permeability to water of a subterranean formation are disclosed.

15 Claims, No Drawings

METHOD AND COMPOSITION FOR RECOVERING HYDROCARBON FLUIDS FROM A SUBTERRANEAN RESERVOIR

TECHNICAL FIELD

This invention provides compounds, compositions and methods for the recovery of hydrocarbon fluids from a subterranean reservoir. More particularly, this invention concerns water-soluble branched polyhydroxyetheramines that modify the permeability of subterranean formations and increase the mobilization and/or recovery rate of hydrocarbon fluids present in the formations.

BACKGROUND OF THE INVENTION

The production of large amounts of water from oil and gas wells constitutes one of the major expenses in the overall recovery of hydrocarbons from a subterranean formation. Many producing oil wells produce a gross effluent having greater than 80% by volume water. Therefore, most of the pumping energy is expended by lifting water from the well. Then the production effluent must be subjected to expensive separation procedures in order to recover water-free hydrocarbons. The water constitutes a troublesome and an expensive disposal problem.

Therefore, it is highly desirable to decrease the amount of water produced from oil and gas wells. Another beneficial effect of decreasing the amount of produced water is realized by decreasing the flow of water in the well bore at a given pumping rate thereby lowering the liquid level over the pump in the well bore, thereby reducing the back pressure in the formation and improving pumping efficiency and net daily oil production.

SUMMARY OF THE INVENTION

We have discovered a family of novel branched polyhydroxyetheramine polymers that effectively reduce the amount of water recovered from subterranean, hydrocarbon-bearing formations, thereby increasing the production rate of hydrocarbons from the formation. The polymers of this invention are particularly effective at decreasing the water permeability with little effect on the oil permeability. Ester comb polymers decrease the water permeability but also significantly reduce the oil permeability. The polymers of this invention are also particularly effective for use in gas and oil wells that operate at temperatures higher than about 200° F. where polymers such as polyacrylamide (PAM), hydrolyzed polyacrylamide (HPAM) and ester-containing polymers are less effective due to hydrolysis of the ester or amide-functionality.

Accordingly, in its principal aspect, this invention is directed to a water-soluble branched polyhydroxyetheramine, wherein the branched polyhydroxyetheramine is prepared by reacting an amine having two reactive hydrogen atoms with a diepoxide to form a polyhydroxyetheramine and then reacting the polyhydroxyetheramine with an N-alkylating agent.

DETAILED DESCRIPTION OF THE INVENTION

"Acyl" means a group of formula R'C(O)—where R' is $C_1$–$C_8$ alkyl. $C_1$–$C_2$ alkyl groups are preferred. Representative acyl groups include acetyl, propionyl, butyryl, and the like.

"Alkoxy" means a $C_1$–$C_8$ alkyl group attached to the parent molecular moiety through an oxygen atom. Representative alkoxy groups include methoxy, ethoxy, propoxy, butoxy, and the like. Methoxy and ethoxy are preferred.

"Alkyl" means a monovalent group derived from a straight or branched chain saturated hydrocarbon by the removal of a single hydrogen atom. Representative alkyl groups include methyl, ethyl, n- and iso-propyl, n-, sec-, iso- and tert-butyl, and the like.

"Alkylamido" means a group of formula R'NHC(O)— where R' is $C_1$–$C_8$ alkyl. $C_1$–$C_2$ alkyl groups are preferred.

"Alkylcarbonyl" means a $C_2$–$C_8$ alkyl group where the alkyl chain is interrupted with a carbonyl (>C=O) group (i.e. an alkyl-C(O)-alkylene-group). Representative alkylcarbonyl groups include methylcarbonymethyl, ethylcarbonylmethyl, methylcarbonylethyl, (2-methylpropyl)carbonylmethyl, and the like.

"Alkylene" means a divalent group derived from a straight or branched chain saturated hydrocarbon by the removal of two hydrogen atoms, for example methylene, 1,2-ethylene, 1,1-ethylene, 1,3-propylene, 2,2-dimethylpropylene, and the like.

"Amine having two reactive hydrogen atoms" means an amine having two N—H groups, where the N—H groups are sufficiently reactive to react with the epoxide groups of a diepoxide as defined herein to form a polyhydroxyetheramine. The amine having two reactive hydrogen atoms may be a primary amine, or a compound containing two secondary amino groups, where the compound containing two secondary amino groups may be cyclic or acyclic. The amine having two reactive hydrogen atoms is optionally substituted with one or more with alkylamido, dialkylamino, hydroxy, hydroxyalkyl, alkoxy, halo, cyano, aryloxy, alkylcarbonyl or arylcarbonyl groups.

"Aryl" means substituted and unsubstituted aromatic carbocyclic radicals and substituted and unsubstituted heterocyclic having from 5 to about 14 ring atoms. Representative aryl include phenyl naphthyl, phenanthryl, anthracyl, pyridyl, furyl, pyrrolyl, quinolyl, thienyl, thiazolyl, pyrimidyl, indolyl, and the like. The aryl is optionally substituted with one or more alkylamido, hydroxy, alkoxy, halo, cyano, aryloxy, alkylcarbonyl or arylcarbonyl groups.

"Arylalkyl" means means an aryl group attached to the parent molecular moiety through a $C_1$–$C_8$ alkylene group. $C_1$–$C_2$ alkylene groups are preferred. Representative arylalkyl groups include phenylmethyl, phenylethyl, phenylpropyl, 1-naphthylmethyl, and the like.

"Arylcarbonyl" means an aryl group attached to the parent molecular moiety through a carbonyl group. Representative arylcarbonyl include benzoyl and substituted benzoyl.

"Aryloxy" means an aryl group attached to the parent molecular moiety through an oxygen atom. Representative aryloxy groups include phenoxy, pyridyloxy, and the like.

"Cycloalkylene" means a divalent group derived from a saturated carbocyclic hydrocarbon by the removal of two hydrogen atoms, for example cyclopentylene, cyclohexylene, and the like.

"Dialkylamino" means a group having the structure —NR'R" wherein R' and R" are independently selected from $C_1$–$C_8$ alkyl. $C_1$–$C_2$ alkyl are preferred. Additionally, R' and R" taken together may optionally be —$(CH_2)_k$— where k is an integer of from 2 to 6. Examples of dialkylamino include, dimethylamino, diethylaminocarbonyl, methylethylamino, piperidino, and the like.

"Halo" and "halogen" mean chlorine, fluorine, bromine and iodine.

"Diepoxide" means a cyclic or acyclic compound containing two epoxide groups. Representative diepoxides include diglycidyl esters of diacids, diglycidyl ethers of diols, epoxidized olefins, and the like.

"Diglycidyl ester of a diacid" means a diepoxide of formula

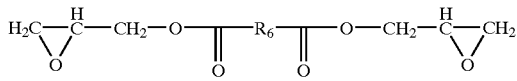

where $R_6$ is $C_2$–$C_{36}$ alkylene or $C_5$–$C_8$ cycloalkylene, where the alkylene is optionally interrupted with a cylcloalkylene group, and where the alkylene or cycloalkylene is optionally substituted with one or more alkylamido, hydroxy, alkoxy, halo, cyano, aryloxy, alkylcarbonyl or arylcarbonyl groups. A preferred diglycidyl ester of a diacid is diglycidyl ether of dimer acid.

"Diglycidyl ether of a diol" means a compound of formula

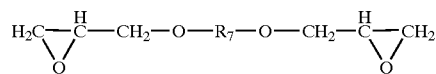

where $R_7$ is $C_2$–$C_{20}$ alkylene or $C_2$–$C_{40}$ alkoxy, where the alkylene is optionally interrupted with a cycloalkylene group and the alkylene or alkoxy is optionally substituted with one or more alkylamido, hydroxy, alkoxy, halo, cyano, aryloxy, alkylcarbonyl or arylcarbonyl groups. Preferred diglycidyl ethers of a diol include bis(2,3-epoxypropyl)ether, diglycidyl ether of 1,4-butanediol, diglycidyl ether of neopentyl glycol, diglycidyl ether of ethylene glycol, glycerol diglycidyl ether, diglycidyl ether of polyethyleneglycols, diglycidyl ether of polypropylene glycols, diglycidyl ether of glycols from the reaction of ethylene oxide with propylene oxide, diglycidyl ether of cyclohexane dimethanol, and the like.

"Epoxidized olefin" means a compound of formula

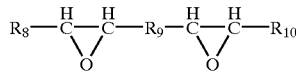

where $R_9$ is $C_2$–$C_{20}$ alkylene, where the alkylene is optionally interrupted with a cylcloalkylene group and optionally substituted with one or more alkylamido, hydroxy, alkoxy, halo, cyano, aryloxy, alkylcarbonyl or arylcarbonyl groups and $R_8$ and $R_{10}$ are H or $R_8$ and $R_{10}$ are connected through a valence bond to form a $C_6$–$C_{20}$ cycloalkyl. Representative epoxidized olefins include 1,2,3,4-diepoxybutane; 1,2,7,8-diepoxyoctane, 1,2,9,10-diepoxydecane, 1,2,5,6-diepoxycyclooctane, and the like.

"Hydroxyalkyl" means a $C_1$–$C_8$ alkyl substituted by one to three hydroxyl groups with the proviso that no more than one hydroxy group may be attached to a single carbon atom of the alkyl group. Representative hydroxyalkyl include hydroxyethyl, 2-hydroxypropyl, and the like.

"Triepoxide" means an acyclic compound containing three epoxide groups. Representative triepoxides include trimethyol propane triglycidyl ether, polyglycidyl ether of castor oil, polyglycidyl ether of an aliphatic polyol, and the like.

"N-Alkylating agent" means a compound of formula $R_{11}X$ where X is halogen, sulfate or sulfonyl and $R_{11}$ is $C_5$–$C_{24}$ alkyl or alkenyl. The alkyl or alkenyl group is optionally interrupted with one or more oxygen atoms, provided that no two oxygen atoms are bonded directly to one another, optionally substituted with one or more hydroxy or aryl groups. Representative N-alkylating agents include halogen-containing polyalkoxides as defined herein; alkyl halides including 1-bromooctane, 1-chlorooctane, 1-chlorohexadecane, 1-chlorooctadecane, 1-bromooctadecane, 1-bromohexadecane, and the like; alcohol sulfonates including sodium lauryl sulfonate, sodium laureth sulfate, sodium octyl sulfate, and the like; and alpha olefin sulfonates including $C_{16}$–$C_{18}$ olefin sulfonate, $C_{14}$–$C_{16}$ olefin sulfonate, $C_{12}$–$C_{14}$ olefin sulfonate, and the like.

"Halogen containing polyalkoxide" means a compound of formula

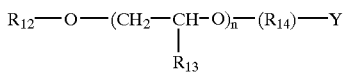

where Y is halogen; $R_{12}$ is H, $C_1$–$C_6$ alkyl, aryl, hydroxyalkyl, or 2,3-epoxypropyl; $R_{14}$ is straight-chain $C_2$–$C_{24}$ alkyl, optionally substituted with one or more hydroxy or $C_1$–$C_6$ alkyl groups. Representative polyalkoxides include polyethylene oxide, polypropylene oxide, polybutylene oxide, polyethylenepropylene oxides and mixtures thereof, and the like.

Preferred Embodiments

The branched polyhydroxyetheramines of this invention are prepared by reacting an amine having two reactive hydrogen atoms with a diepoxide to form a polyhydroxyetheramine and then reacting the polyhydroxyetheramine with an N-alkylating agent.

In preparing the polyhydroxyetheramine, the reactants are generally employed in a mole ratio of amine having two reactive amino hydrogens to diepoxide of about 0.5:1 to about 1.4:1, preferably about 0.8:1 to about 1.1:1 and more preferably 0.9:1 to about 1.05:1.

The reaction of the amine and the diepoxide is very exothermic and typically requires a solvent and cooling to control the exothermic nature when prepared in a batch reactor. Suitable solvents include water, ether and alcohols such as di(propylene glycol) methyl ether, 2-methoxyethyl ether and the like. Preferably, the initial reaction is conducted under a blanket of nitrogen or another inert gas, preferably at a temperature of about 25° C. to about 240° C., more preferably at a temperature of about 25° C. to about 150° C. and still more preferably at a temperature of about 25° to about 100° C. After the exotherm, subsequent reaction is carried out between 140° C. and 200° C., preferably between 140° C. and 180 ° C. and more preferably between 140° C. and 160° C. for about 10 minutes to about 100 hours depending on the viscosity desired for the final product. The reaction can be conducted neat in a batch reactor or in an extruder.

In a preferred aspect of this invention, the amine having two reactive hydrogen atoms is selected from the group consisting of amines of formula (a)–(g)

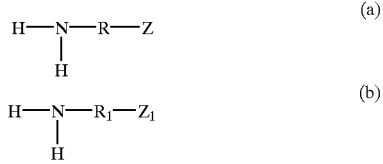

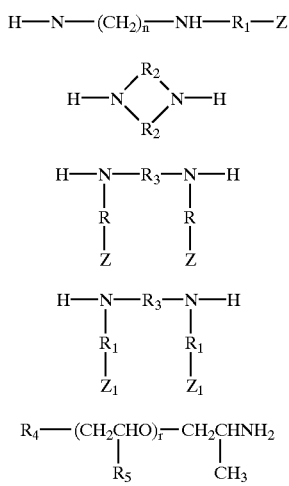

(c) H—N—(CH$_2$)$_n$—NH—R$_1$—Z (d) H—N(R$_2$)(R$_2$)N—H (e) H—N(R)(Z)—R$_3$—N(R)(Z)—H (f) H—N(R$_1$)(Z$_1$)—R$_3$—N(R$_1$)(Z$_1$)—H (g) R$_4$—(CH$_2$CHO)$_r$—CH$_2$CHNH$_2$ with R$_5$ and CH$_3$ substituents Wherein R is C$_2$–C$_{10}$ alkylene, optionally substituted with one or more hydroxy or hydroxyalkyl groups; R$_1$ is independently selected at each occurrence from a group of formula (—CH$_2$—CH$_2$—O—)$_p$ and a group of formula

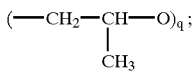

(—CH$_2$—CH(CH$_3$)—O)$_q$;

R$_2$ is C$_2$–C$_{10}$ alkylene, optionally substituted with alkylamido, hydroxy, alkoxy, halo, cyano, dialkylamine, aryloxy, alkylcarbonyl or arylcarbonyl; R$_3$ is C$_2$–C$_{20}$ alkylene optionally substituted with alkylamido, hydroxy, alkoxy, halo, cyano, aryloxy, alkylcarbonyl or arylcarbonyl; R$_4$ is alkoxy; R$_5$ is H or —CH$_3$; Z is hydrogen, alkylamido, hydroxy, dialkylamine, alkoxy, halo, aryoxy, cyano, alkylcarbonyl, or arylcarbonyl; Z$_1$ is hydrogen, C$_1$–C$_7$ alkyl or acyl; and n, p, q and r are independently integers of 1 to about 45.

Amines of formula (a)–(g) are commercially available from a variety of sources including Aldrich Chemicals, Milwaukee, Wis.; Angus Chemical Company, Buffalo Grove, Ill.; Air Products and Chemicals, Inc., Allentown, Pa.; Ashland Distribution Company, Columbus, Ohio; Dow Chemical Company, Midland, Mich.; Fleming Labs, Inc, Charlotte, N.C.; Huntsman Corporation, Houston, Tex.; Union Carbide Corporation, Danbury, Conn.; and others.

In another preferred aspect, R is methylene or ethylene; R$_2$ is ethylene; R$_3$ is C$_2$–C$_{20}$ alkylene optionally substituted with alkylamido, dialkylamino, hydroxy or alkoxy; and Z is alkylamido, dialkylamino, hydroxy or alkoxy.

In another preferred aspect, the amine is selected from the group consisting of methylamine; ethylamine; propylamine; butylamine; sec-butylamine; isobutylamine; 3,3-dimethylbutylamine; hexylamine; benzylamine; 2-amino-1-butanol; 4-amino-1-butanol; 2-amino-2-methyl-1-propanol; 6-amino-1-hexanol; ethanolamine; propanolamine; tris(hydroxymethyl)aminomethane; 1-amino-1-deoxy-D-sorbitol; 3-amino-1,2-propanediol; 2-amino-2-methyl-1,3-propanediol; 2-amino-2-ethyl-1,3-propanediol; 3-(dimethylamino)propylamine; N,N-dimethylethylenediamine; N,N-diethylethylenediamine; 1-(2-aminoethyl)piperidine; 4-(2-aminoethyl)morpholine; 2-(2-aminoethyl)-1-methylpyrrolidine; 1-(2- aminoethyl) pyrrolidine; 2-(2-aminoethyl)pyridine; 2-(2-aminoethoxy) ethanol; 2-(2-aminoethylamino)ethanol; piperazine, 2-methyl piperazine, 2,6-dimethylpiperazine; 2-(methylamido)piperazine; N,N'-bis(2-hydroxyethyl) ethylenediamine, N,N'-dimethylethylenediamine, N,N'-dimethyl-1,4-phenylenediamine and N,N'-dimethyl-1,6-hexanediamine.

In another preferred aspect, the diepoxide is selected from the group consisting of diglycidyl esters of diacids, diglycidyl ethers of diols and epoxidized olefins.

In another preferred aspect, the diepoxide is selected from the group consisting of diglycidyl ether of dimer acid, bis(2,3-epoxypropyl)ether, diglycidyl ether of 1,4-butanediol, diglycidyl ether of neopentyl glycol, diglycidyl ether of ethylene glycol, glycerol diglycidyl ether, diglycidyl ether of polyethyleneglycols, diglycidyl ether of polypropylene glycols, diglycidyl ether of glycols from the reaction of ethylene oxide with propylene oxide, diglycidyl ether of cyclohexane dimethanol, 1,2,3,4-diepoxybutane; 1,2,7,8-diepoxyoctane, 1,2,9,10-diepoxydecane and 1,2,5,6-diepoxycyclooctane.

In another preferred aspect of this invention, aliphatic triepoxides can be mixed with the diepoxides to provide crosslinking. Suitable aliphatic triepoxides are trimethyol propane triglycidyl ether, polyglycidyl ether of castor oil and polyglycidyl ether of an aliphatic polyol.

We have discovered that the presence of mine, tertiary amine or ditertiary amine end groups in the polyhydroxyetheramine is preferred as opposed to an epoxide end group in order to improve solubility in water and alcohol solvents and prevent continuing reaction.

Secondary amine end groups are obtained from the reaction of the remaining unreacted epoxide groups with the above amines having two available amino hydrogens at a concentration of 2 to 5 mole % excess amine.

Tertiary amine end groups are obtained by reacting the unreacted epoxide groups with amines having one available amino hydrogen such as diethanolamine, diisopropanolamine, N-methyl-D-glucamine, N-methylpropylamine, dimethylamine, diethylamine, dipropylamine, diisopropylamine and the like.

Ditertiary amine end groups are obtained by reacting the unreacted epoxide groups with amines having one available amino hydrogen substituted with a tertiary amine group such as N,N,N'-trimethyl-1,3-propanediamine, N,N,N'-trimethylethylenediamine, N,N-dimethyl-N'-ethylethylenediamine, N,N,N'-triethylethylenediamine and the like. Ditertiary amine end groups also provide extended tertiary amine groups for grafting N-alkylating agents onto the polyhydroxyetheramine backbone.

The backbone polyhydroxyetheramine formed by reaction of the amine with two reactive amino hydrogens and the diepoxide varies in percent solids from about 20 to 100, preferably from about 50 to about 80 and more preferably from about 60 to about 70 weight percent in a suitable solvent such as an alcohol or ether.

Side chains or branches are attached to the polyhydroxyetheramine backbone by reaction with one or more N-alkylating agents.

In a preferred aspect of this invention, the N-alkylating agent is selected from the group consisting of halogen-containing polyalkoxides, alkyl halides, alcohol sulfonates and alpha olefin sulfonates.

In another preferred aspect, the N-alkylating agent is a halogen containing polyalkoxide.

We have discovered that a low percentage of the tertiary amines in the polyhydroxyetheramine backbone polymer can be grafted with the N-alkylating agent. However, if the amine having two reactive amino groups used to prepare the polyhydroxyetheramine backbone polymer is substituted with a tertiary amine group to give an extended tertiary amine, a much higher percentage of the N-alkylating agent can be reacted. Examples of such amines having two reactive amino groups and substituted with a tertiary amine group are 3-(dimethylamino)propylamine, N,N-dimethylethylenediamine, N,N-diethylethylenediamine, 1-(2-aminoethyl)piperidine, 4-(2-aminoethyl)morpholine, 2-(2-aminoethyl)-1-methylpyrrolidine, 1-(2-aminoethyl) pyrrolidine, and 2-(2-aminoethyl)pyridine. Extended tertiary amines for reaction with N-alkylating agent can also be provided by the previously mentioned ditertiary amine end groups.

The amount of the amine having two reactive amino hydrogen atoms and a tertiary amine group comprises 0 to about 50 mole percent of the total amines having two reactive amino hydrogen atoms reacted with the diepoxide, depending on which amine having two reactive amino hydrogen atoms and a tertiary amine group is reacted. For example, 3-(dimethylamino)propylamine comprises 0 to about 10, preferably 0 to about 6 and more preferably 0 to about 2 mole percent of the total amines having two reactive amino hydrogens because it contains some methylaminopropylamine which crosslinks.

The N-alkylating agents are grafted onto tertiary amine groups on the polyhydroxyetheramine backbone polymer at a temperature of about 40° C. to about 100° C., preferably about 60° C. to about 95° C. and more preferably between about 85° C. and about 90° C. The higher the grafting temperature, the faster the grafting rate.

The rate of the grafting reaction is also influenced by pH. The reaction is carried out at a pH of about 7.5 to about 12.0, preferably about 8.0 to about 9.0 and more preferably about 8.4 to about 8.8.

The polyhydroxyetheramine polymer can be directly reacted with the N-alkylating agent or the polyhydroxyetheramine can be reacted with an acid, such as hydrochloric acid or sulfuric acid and then reacted with the N-alkylating agent.

The resulting grafted polymer varies in percent solids from about 20 to about 60, preferably about 25 to about 50 and more preferably about 35 to about 50 weight percent in water, ether or alcohol solvent.

One method of following the rate of the grafting reaction is to monitor the viscosity. When the viscosity of the graft polymer reaches about 200 cps to about 6000 cps, preferably about 2000 cps to about 5000 cps and more preferably about 4000 cps to about 5000 cps, the grafting reaction is usually stopped by adding a mixture of acid and salt water to reach an acidic pH, preferably about pH 2.0 to about 6.0 and more preferably about 3.5 to about 5.0. Sulfuric acid or hydrochloric acid are the preferred acids.

Preferred water-soluble branched polyhydroxyetheramines according to this invention include, but are not limited to diethanolamine capped ethanolamine/diglycidyl ether of neopentyl glycol copolymer grafted with epichlorohydrin terminated polyethyleneglycol methyl ether; N,N,N'-trimethyl-1,3-propanediamine capped ethanolamine/3-(dimethylamino)propylamine/diglycidyl ether of neopentyl glycol terpolymer grafted with epichlorohydrin terminated polyethyleneglycol methyl ether polymer; diethanolamine capped 3-(dimethylamino)propylamine/ethanolamine/poly (ethylene glycol) diglycidyl ether terpolmer grafted with epichlorohydrin terminated polyethyleneglycol methyl ether; and diethanolamine capped 3-(dimethylamino) propylamine/ethanolamine/ethylene glycol diglycidyl ether terpolymer grafted with epichlorohydrin terminated polyethyleneglycol methyl ether.

In another aspect, this invention is directed to a method of modifying the permeability to water of a subterranean formation comprising injecting into the subterranean formation an aqueous composition comprising from about 0.005 percent to about 2 percent, by volume, of a water-soluble branched polyhydroxyetheramine, wherein the branched polyhydroxyetheramine is prepared by reacting an amine having two reactive hydrogen atoms with a diepoxide to form a polyhydroxyetheramine and then reacting the polyhydroxyetheramine with an N-alkylating agent.

The aqueous composition comprising branched polyhydroxyetheramine polymers of this invention are applied to the formation by forcing, injecting or pumping composition directly into the formation to be treated so that the polymer contacts or treats the formation or the desired portion of the formation to alter the permeability of the formation as desired.

Particulate material (e.g. sand, silica flour and asbestos) can also be added to or suspended in the aqueous composition.

The treatment of a subterranean formation through an oil well can be accomplished using one or more liquid spacers, preflushes or afterflushes, such as a dilute salt solution and/or an aqueous alkali metal halide solution, into the formation to pretreat or clean the formation, then injecting the aqueous composition of this invention in an amount calculated to contact the desired portion of the formation with the branched polyhydroxyetheramine polymer.

In another aspect of this invention, the N-alkylating agent and the polyhydroxyetheramine backbone polymer can also be mixed and pumped as a preflush ahead of a fracture-stimulation treatment before these components can react. In-situ reaction of the individual components allows deeper penetration of high-permeability strata from which undesired water flow typically occurs. The water-thin viscosity of the N-alkylating agent and polyhydroxyetheramine backbone polymer allows lower placement pressures.

In a preferred aspect, the polyhydroxyetheramine backbone polymer is prepared by the reaction of an amine with two reactive hydrogen with a diepoxide as defined herein.

After the polymer preflush is injected and the fracturing treatment placed, the well is shut in for about 10 to 18 hours, allowing the N-alkylating agent and polyhydroxyetheramine polymer to react. In some cases this polymer preflush can be preceded by a solvent preflush that removes asphaltene and paraffin deposits in the formation.

The foregoing may be better understood by reference to the following examples, which are presented for purposes of illustration and are not intended to limit the scope of this invention.

EXAMPLE 1

Preparation of Diethanolamine Capped Ethanolamine (EA)/diglycidyl Ether of Neopentyl Glycol (DGE NPG) Polymer Diglycidyl ether of neopentyl glycol (216.31 g, 1.000 moles, available as Heloxy Modifier 68 from Shell Chemical Company, Houston, Tex.) and di(propyleneglycol)methyl ether (128.03 g, available from Ashland Distribution Company, Columbus, Ohio) is weighed into a 1-liter resin kettle equipped with a thermocouple and heating device, condenser, stirrer and nitrogen purge assembly. The reaction mixture is heated to 83° C. A mixture of ethanolamine (61.05 g, 0.9995 moles) and di(propylene glycol)methyl ether (42.02 g) is added dropwise over 21 minutes. The resulting exotherm quickly brings the temperature to 156° C. The reactor contents are maintained at a temperature between 142° C. and 151° C. for 9 hours and 31 minutes. Diethanolamine (10.55 g, 0.1003 moles) is added dropwise to the reactor over 9 minutes. The transfer apparatus is rinsed with di(propylene glycol) methyl ether (2 g). The reactor contents are heated for 10 more minutes and then cooled to room temperature.

EXAMPLE 2

Preparation of a Diethanolamine Capped Polyhydroxyetheramine Backbone Polymer Grafted with Epichlorohydrin Terminated Polyethylene Glycol Methyl Ether A 63 weight percent solution of diethanolamine capped ethanolamine (EA)/diglycidyl ether of neopentyl glycol (DGE NPG) polymer (111.04 g) in di(propylene glycol) methyl ether, prepared according to the method of Example 1, water (79.12 g) and a 54.47 weight percent solution in water of epichlorohydrin terminated polyethylene glycol methyl ether (92.26 g,~5082 g/mole, 0.0182 moles, available from ONDEO Nalco Energy Services, Sugar Land, Tex.) are added to a 500-ml beaker. The pH of the solution is 7.73. The solution is titrated slowly while stirring with 28.67 g of 3.6 weight percent caustic to a pH of 8.40. The contents of the beaker are transferred to a 4-neck 500-ml round bottom flask equipped with a thermocouple and heating device, condenser, stirrer and nitrogen purge assembly and heated to 92° C. with stirring. After heating between 88° C. and 92° C. for 2 hours and 34 minutes, a sample is removed and the viscosity at room temperature is determined to be 92 cps. Thirty five hours and 18 minutes later, the viscosity is 336 cps. The reactor contents are a dark brown colored opaque liquid. The reaction mixture is cooled to room temperature. The pH is 7.71. The pH is adjusted to 8.39 by titration with 22.76 g of 3.6 weight percent caustic. The reactor contents are heated between 88° C. and 93° C. for an additional 26 hours and 30 minutes. The final Brookfield viscosity of the resulting 36.6 weight percent aqueous polymer solution is 459 cps.

EXAMPLE 3

Preparation of N,N,N'-Trimethyl-1,3-propanediamine Capped Ethanolamine (EA)/3-(dimethylamino)propylamine (DMAPA)/diglycidyl Ether of Neopentyl Glycol (DGE NPG) Polymer Diglycidyl ether of neopentyl glycol (200.15 g, 0.9254 moles) and di(propylene glycol)methyl ether (70.65 g) is weighed into a 4-neck 500-ml round bottom flask equipped with a thermocouple and heating device, condenser, stirrer and nitrogen purge assembly. The reaction mixture is heated to 65° C. A solution of 3-(dimethylamino)propylamine (2.85 g, 0.0279 moles, available from Huntsman Corporation, Houston, Tex.) and ethanolamine (40.93 g, 0.6701 moles) in di(propylene glycol)methyl ether (60.13 g) is added dropwise over 51 minutes. The resulting exotherm raises the reaction temperature to 156° C. The reactor contents are then maintained at a temperature between 140° C. and 168° C. for 41 hours and 57 minutes. The reactor contents are cooled to room temperature. N,N,N'-trimethyl-1,3-propanediamine (8.12 g, 0.06987 moles, available from Aldrich Chemical Company, Milwaukee, Wis.) is added and the reactor contents are heated to 161° C. and cooled again to room temperature. The Brookfield viscosity is of the resulting polymer is 63,400 cps at 23° C.

EXAMPLE 4

Grafting Epichlorohydrin Terminated Polyethylene Glycol Methyl Ether) onto a Sulfated N,N,N'-trimethyl-1,3-propanediamine Capped Polyhydroxyetheramine Backbone Polymer A 70.85 weight percent solution of N,N,N'-trimethyl-1,3-propanediamine capped ethanolamine (EA)/3-(dimethylamino)propylamine (DMAPA)/diglycidyl ether of neopentyl glycol (DGE NPG) polymer (111.93 g) in di(propylene glycol) methyl ether, prepared as in Example 3, water (79.15 g) and 93% sulfuric acid (7.91 g) are weighed into a 4-neck 500-ml round bottom flask equipped with a thermocouple and heating device, condenser, stirrer and nitrogen purge assembly. The reaction mixture is heated to 83° C. with stirring and then cooled to room temperature.

The reactor contents and a 54.47 weight percent solution in water of epichlorohydrin terminated polyethyleneglycol methyl ether (12.69 g,~5082 g/mole, 0.0025 moles) are added to a 500-ml beaker and mixed by stirring to give a water-soluble brown homogeneous opaque liquid. The pH of the liquid is 6.14. The liquid is titrated slowly while stirring with 157.12 g of 3.6 weight percent caustic to a pH of 8.69. During the titration after pH 7.0 is reached, two phases develop and the resulting polymer (bottom phase) coats the pH probe. The pH probe is repeatedly washed with acetone and water to remove the polymer coating between pH measurements.

The contents of the beaker are transferred to a 4-neck 500-ml round bottom flask equipped with a thermocouple and heating device, condenser, stirrer and nitrogen purge assembly and heated to 79° C. with stirring. After heating between 79° C. and 88° C. for 11 hours, the reactor contents are cooled to room temperature. The product consists of two phases, a solid phase (bottom layer) and a liquid layer (top). The reactor contents are heated to 65° C. and maintained between 68° C. and 86° C. Polymer growth is terminated by adding a kill solution of 93% sulfuric acid (2.41 g), NaCl (4.02 g) and water (40.00 g). The reaction mixture is cooled to room temperature and transferred to a 500-ml beaker. The pH of the reaction mixture is 7.02. The pH is re-adjusted to 2.45 by the addition of 93% sulfuric acid (6.12 g).

The reaction mixture is digested by transferring the contents from the 500-ml beaker to a 4-neck 500-ml round bottom flask equipped with a thermocouple and heating device, condenser, stirrer and nitrogen purge assembly and heating between 91° C. and 94° C. for 70 minutes with stirring. The reaction mixture (pH 5.8) is cooled to room temperature. A few particles are present and removed by filtering through silk cloth. The pH is re-adjusted to 2.44 by adding 1.20 g 93% sulfuric acid followed by 4.90 g of 3.6 weight percent caustic. The final viscosity is 185 cps. The percent solids of the final aqueous polymer solution is 24%.

EXAMPLE 5

Preparation of N,N,N'-Trimethyl-1,3-propanediamine (TMPDA) Capped 3-(dimethylamino)propylamine (DMAPA)/ethanolamine (EA)/diglycidyl Ether of Neopentyl Glycol (DGE NPG) Terpolymer.

Diglycidyl ether of neopentyl glycol (200.2 g, 0.9257 moles) and di(propylene glycol) methyl ether (70.11 g) are weighed into a 1-liter 4-neck round bottom flask equipped with a thermocouple and heating device, condenser, stirrer and nitrogen purge assembly and the reaction mixture is heated to 79° C. The nitrogen purge system is then replaced with an additional funnel.

3-(Dimethylamino)propylamine (2.87 g, 0.028 moles), ethanolamine (41.05 g, 0.6721 moles) and di(propylene glycol)methyl ether (60.13 g) are weighed into a beaker and transferred to the addition funnel and added dropwise to the reaction mixture over a period of 41 minutes. The resulting exotherm quickly brings the reaction temperature to 142° C.

The reaction mixture is maintained at a temperature of less than 142° C. by applying cooling to the reactor.

The nitrogen purge assembly is re-attached and the reaction mixture is heated between 152° C. and 167° C. for 60 hours and 43 minutes, giving a viscous liquid with a viscosity of 100,880 cps.

The reaction mixture is cooled to 54° C. and N,N,N'-trimethyl-1,3-propanediamine (8.15 g, 0.07013 moles) is added. The reaction mixture is heated between 150° C. and 154° C. for 88 minutes and then cooled to room temperature to give a polymer solution with a viscosity of 121,500 cps.

EXAMPLE 6

Preparation of N,N,N'-trimethyl-1,3-propanediamine Capped Polyhydroxyetheramine Backbone Polymer Grafted with Epichlorohydrin Terminated Polyethylene Glycol Methyl Ether A 65.95 weight percent solution of N,N,N'-trimethyl-1,3-propanediamine (TMPDA) capped 3-(dimethylamino) propylamine (DMAPA)/ethanolamine (EA)/diglycidyl ether of neopentyl glycol (DGE NPG) terpolymer (131.04 g) in di(propylene glycol) methyl ether, prepared as in Example 5, water (99.77 g) and 93% sulfuric acid (9.33 g) are added to a 4-neck 500-ml round bottom flask equipped with a thermocouple and heating device, condenser, stirrer and nitrogen purge assembly and heated to 80° C. with stirring. The reaction mixture (198.36 g) is cooled to room temperature and poured into a beaker. A 54.47 weight percent solution of epichlorohydrin terminated polyethyleneglycol methyl ether (91.8 g;~5082 g/mole, 0.0181 moles) in water is added. The pH of this mixture is 5.89. The pH is adjusted to 8.38 with 3.6 weight percent solution of sodium hydroxide (148.87 g) while stirring. During the pH adjustment, the original dark brown liquid becomes two separate phases with the solid phase on the bottom. The 2 phases are inter-mixed by stirring and heating between 70° C. and 90° C. for 94 minutes. At this point, the polymer begins to wrap around the stirring rod so a kill solution of 93% sulfuric acid (2.33 g) and sodium chloride (4.00 g) in water (40.06 g) is added at 90° C. The reaction mixture is heated between 88° C. and 90 ° C. for an additional 35 minutes and then cooled to room temperature. The pH of the material is 6.34. The reaction mixture is transferred to a beaker and additional 93% sulfuric acid is added dropwise with stirring until a pH of 2.51 is obtained. The reaction mixture is further digested by transferring to a 4-neck 500-ml round bottom flask equipped with a thermocouple and heating device, condenser, stirrer and nitrogen purge assembly and heating between 77° C. and 86° C. for 8 hours and 21 minutes to provide a polymer solution having a pH of 3.53 and a viscosity at 25° C. of 220 cps.

EXAMPLE 7

Preparation of Diethanolamine (DEA) Capped 3-(dimethylamino)propylamine (DMAPA)/ ethanolamine (EA)/poly(ethylene glycol) Diglycidyl Ether Terpolymer.

Poly(ethylene glycol) diglycidyl ether (280.54 g, 0.5333 mole, Average Mn of 536, available from Aldrich Chemical Company) is weighed into a 500-ml 4-neck round bottom flask equipped with a thermocouple and heating device, condenser, stirrer and nitrogen purge assembly and heated to 89° C. A blend of 3-(dimethylamino)propylamine (0.9951 g, 0.0097 moles) and ethanolamine (28.37 g, 0.4645 moles) is added dropwise. The resulting exotherm quickly brings the temperature to 187° C. The reaction mixture is cooled to about 138° C. with an ice bath. The reaction mixture is maintained at a temperature between 150° C. and 157° C. for 3 hours and 39 minutes and then cooled to room temperature. The Brookfield viscosity of the mixture is 130,000 cps at 25° C.

Di(propylene glycol) methyl ether (189.82 g) is added to the contents to give a 943 cps liquid. The reactor contents are then heated between 152 and 170° C. for 60 hours and 40 minutes giving a viscous liquid with a viscosity of 2606 cps.

A solution of ethanolamine (3.72 g) in di(propylene glycol) methyl ether (3.15 g) is added to the reactor and the reaction mixture is heated at 153° C. to 173° C. for 7 hours and 15 minutes, at which point the vortex created by the stirrer disappears. A solution of diethanolamine (2.43 g, 0.0231 moles) in di(propylene glycol) methyl ether (4.89 g) is added and the reaction mixture is immediately cooled to room temperature to give a solution with a Brookfield viscosity of 182,000 cps at 25° C.

EXAMPLE 8

Preparation of Diethanolamine (DEA) Capped 3-(dimethylamino)propylamine (DMAPA)/ ethanolamine (EA)/poly(ethylene glycol) Diglycidyl Ether Grafted with Epichlorohydrin Terminated Polyethyleneglycol Methyl Ether A 61.5 weight percent solution of diethanolamine (DEA) capped 3-(dimethylamino)propylamine (DMAPA)/ ethanolamine (EA)/poly(ethylene glycol) diglycidyl ether terpolymer (111.86 g) in di(propylene glycol) methyl ether, prepared as in Example 7, water (278.76 g) and a 67.12 weight percent solution in water of epichlorohydrin terminated polyethyleneglycol methyl ether (91.9 g; 5082 g/mole, 0.0181 moles) are added to a 600-ml beaker with a stirring bar. The pH of the mixture is 7.26. The pH is adjusted to 8.50 by adding 23.95 g of an aqueous 3.6 weight percent caustic solution. The Brookfield viscosity is 186 cps at 25° C. The reaction mixture is transferred to a 4-neck 500-ml round bottom flask equipped with a thermocouple and heating device, condenser, stirrer and nitrogen purge assembly and heated at 87° C. to 91° C. for 118 minutes. The reaction mixture is cooled to room temperature. The solution has a pH of 7.0 and a viscosity is 336.8 cps.

The pH is re-adjusted to 8.71 with 15.80 g of an aqueous 3.6 weight percent caustic solution. The reactor contents are heated between 88° C. and 92° C. for 2 hours and 55 minutes. The reaction mixture is cooled to room temperature to provide a solution having a viscosity of 1140 cps.

The reaction mixture is heated for another 44 minutes at 87° C. to 92° C. at which point the vortex created by stirring disappears. A kill solution (11.96 g) consisting of 12.65 weight percent sulfuric acid and 22.05 weight percent NaCl in water is added and the reaction mixture is then heated for another couple of minutes at 84° C. to 89° C. The reaction mixture is then cooled to room temperature to provide a solution having a viscosity of 635 cps and a pH of 1.96. The pH is readjusted to 4.21 by the adding of 28.16 g of an aqueous 3.6 weight percent caustic solution to provide a polymer solution having a viscosity of 550.4 cps. Thermogravimetric analysis indicates the non-volatile content of the final solution is 23.07 wt %.

EXAMPLE 9

Preparation of Diethanolamine (DEA) Capped 3-(dimethylamino)propylamine (DMAPA)/ ethanolamine (EA)/ethylene Glycol Diglycidyl Ether Terpolymer Ethylene glycol diglycidyl ether (50 weight percent, 196.08 g, 0.5628 moles) is weighed into a 500-ml 4-neck round bottom flask equipped with a thermocouple and heating device, condenser, stirrer and nitrogen purge assembly. The ethylene glycol diglycidyl ether is heated to 78° C. A blend of 3-(dimethylamino)propylamine (0.7242 g, 0.0071 moles) and ethanolamine (19.98 g, 0.3271 moles) is added dropwise over two minutes. The resulting exotherm quickly brings the reaction temperature to 180° C. The reaction flask is cooled immediately with an ice bath. Di(propylene glycol) methyl ether (132.07 g) is added over a 4 minute period. The reactor temperature is 93° C. The reaction mixture is heated and maintained at a temperature between 149° C. and 155° C. for 46 minutes. A solution of diethanolamine (1.48 g, 0.01408 moles) in di(propylene glycol) methyl ether (11.05 g) is added, followed by di(propylene glycol) methyl ether (10.0 g). The reaction mixture is heated between 152° C. and 153° C. for 10 minutes and then cooled to room temperature to provide a mixture having a Brookfield viscosity of 87 cps at 25° C.

The reaction mixture is then heated at 151° C. to 171° C. for 7 hours and 28 minutes and then cooled to room temperature. The Brookfield viscosity of the resulting mixture is 1695 cps.

EXAMPLE 10

Preparation of Diethanolamine (DEA) Capped 3-(dimethylamino)propylamine (DMAPA)/ethanolamine (EA)/ethylene Glycol Diglycidyl Ether Terpolymer Grafted with Epichlorohydrin Terminated Polyethyleneglycol Methyl Ether Diethanolamine (DEA) capped 3-(dimethylamino)propylamine (DMAPA)/ethanolamine (EA)/ethylene glycol diglycidyl ether terpolymer (58.77 weight percent, 111.58 g) in di(propylene glycol) methyl ether, prepared as in Example 9, water (79.36 g) and epichlorohydrin terminated polyethyleneglycol methyl ether (67.12 weight percent in water, 91.84 g; 5082 g/mole, 0.0181 moles) are added to a 600-ml beaker with a stirring bar. The pH of the mixture is 8.53. The Brookfield viscosity is 139 cps at 25° C. The mixture is transferred to a 4-neck 500-ml round bottom flask equipped with a thermocouple and heating device, condenser, stirrer and nitrogen purge assembly and heated at 91° C. to 93° C. for 116 minutes at which point the vortex created by the stirrer disappears. 39.3 g of a Kill Solution of 12.74% sulfuric acid (93%) and 21.08% NaCl in water is added and the reaction mixture is cooled to room temperature. The resulting polymer solution has a pH of about 4.46, a Brookfield viscosity of 194 cps and a calculated percent solids of 39.50 weight percent.

EXAMPLE 11

The effectiveness of these water conformance polymers is measured by an independent laboratory using a Dual Core Water to Oil Ratio (WOR) test as described below. The results are summarized in Tables 1–5.

Testing is conducted using a dual core holder apparatus consisting of two 1.5" O.D.×30" core holders with pressure taps at 3" and 15" from the injection (wellbore) end to give three pressure zones along the core length of 3", 12" and 15". The two cores are mounted parallel and connected at the injection end to a common wellbore. Two hundred to 300 md Berea sandstone is used as the test matrix. Five, six-inch core plugs are stacked in each cell to give 30" of length. Test conditions are 1500 psi confining pressure, 500 psi pore (back) pressure and 150° F. The Berea core are vacuum saturated in API standard brine solution (9% NaCl, 1% CaCl$_2$). The cores are loaded into the core holder and flooded in the "production" direction (toward the wellbore) at constant pressure to steady state rate and pressure drop across each pressure zone. One core stack is then flooded with a mixture of 70% Isopar G and 30% Isopar V oil. This mixture gave a viscosity of 0.9 cp at the test temperature or a 2:1 mobility ratio. The flood is conducted at constant pressure to steady state oil rate and irreducible water saturation at that flow rate.

Flow direction is reversed and both cores are treated simultaneously with the water-soluble branched polyhydroxyetheramines of this invention at 2000 ppm active material in 2% KCl. Treatment is conducted at constant pressure and the treatment volume into each core monitored with time to a total treatment volume of five total pore volumes.

Flow direction is again reversed and each core flooded independently with either oil or water depending on the saturation fluid prior to treatment. The flood is conducted at constant pressure to steady state rate. The brine-saturated core is continually flooded for 48 hours to evaluate the longevity of the treatment and its resistance to wash-off with continued flow. Flow rates of the water to oil before and after the treatment are compared and used to calculate the WOR before and after treatment.

Treatment of sandstone core plugs with two water soluble polyhydroxyetheramines having side chains provided more than 50% water shut-off with little reduction to oil permeability and a third water soluble polyhydroxyetheramine actually improved the oil permeability. The stability of the treatments are maintained or continued to improve after 48 hours. The results are presented in detail below.

TABLE 1

Water to Oil Summary Polymer of Example 2

|  | Water Rate At 100 psi | Oil Rate At 100 psi | Water-to-oil ratio |
| --- | --- | --- | --- |
| Initial | 36.42 | 19.17 | 1.9 |
| After Treatment | 13.53 | 16.55 | 0.82 |
| 48 hrs. | 9.49 | 16.55 | 0.57 |
| % Permeability Change | 73.94% | 13.67% | 70.0% |

Table 1 shows that the diethanolamine capped ethanolamine (EA)/diglycidyl ether of neopentyl glycol (DGE NPG) polymer grafted with epichlorohydrin terminated polyethyleneglycol methyl ether (prepared as in Example 2) at 2000 ppm at 150° F. in brine reduces water rate by about 74% while reducing the oil permeability by about 14%.

TABLE 2

Water to Oil Summary Polymer of Example 4

|  | Water Rate At 100 psi | Oil Rate At 100 psi | Water-to-oil ratio |
| --- | --- | --- | --- |
| Initial | 28.5 | 14.89 | 1.91 |
| After Treatment | 16.89 | 12.38 | 1.36 |
| 48 hrs. | 10.9 | 12.38 | 0.88 |
| % Permeability Change | 61.75% | 16.9% | 46.07% |

Table 2 shows that the sulfated N,N,N'-trimethyl-1,3-propanediamine capped ethanolamine (EA)/3-(dimethylamino)propylamine (DMAPA)/diglycidyl ether of neopentyl glycol (DGE NPG) polymer grafted with epichlorohydrin terminated polyethyleneglycol methyl ether polymer (prepared as in Example 4) at 2000 ppm at 150° F. in brine reduces the water rate by about 62% while reducing the oil permeability by about 17%.

TABLE 3

Water to Oil Ratio Summary
Polymer of Example 8

|  | Water Rate at 100 psi | Oil Rate at 100 psi | Water-to-oil ratio |
|---|---|---|---|
| Initial | 25.97 | 11.6 | 2.24 |
| After Treatment | 14.9 | 10.5 | 1.42 |
| Final after 16 hrs. | 11.9 | 10.5 | 1.13 |
| % Permeability Change | 54.2% | 9.48% | 49.55% |

As shown in Table 3, diethanolamine (DEA) capped 3-(dimethylamino)propylamine (DMAPA)/ethanolamine (EA)/poly(ethylene glycol) diglycidyl ether grafted with epichlorohydrin terminated polyethyleneglycol methyl ether (Prepared as in Example 8) at 2000 ppm at 150° F. in brine provides 50% water shut-off with only a 9.5% drop in oil permeability. Most commercial water conformance polymers shut off water as well as this polymer but at the expense of a much larger drop in oil permeability than 9.5%. For example, oil rate for a commercially available ester-containing control polymer drops 70%.

TABLE 4

Water to Oil Ratio Summary
Polymer of Example 10

|  | Water Rate at 100 psi | Oil Rate at 100 psi | Water-to-oil ratio |
|---|---|---|---|
| Initial | 25.25 | 14.89 | 1.7 |
| After Treatment | 19.94 | 17.56 | 1.14 |
| Final after 48 hrs. | 12.85 | 17.56 | 0.73 |
| % Permeability Change | 49.11% | −17.93% | 57.1% |

As shown in Table 4, diethanolamine(DEA) capped 3-(dimethylamino)propylamine (DMAPA)/ethanolamine (EA)/ethylene glycol diglycidyl ether terpolymer grafted with epichlorohydrin terminated polyethyleneglycol methyl ether (prepared as in Example 10) at 2000 ppm in brine also provided 50% water shut-off but after 48 hours flow time. The WOR data shows that the decline in permeability is still continuing after the 48 hours. WOR data shows that an ester-containing control polymer has completed water shut-off before the 48 hours flow time ever begins. Finally the WOR data showed that this polymer exhibits a surface active characteristic or attribute that increases the relative oil permeability following the treatment and that results in improvement in the reduction of WOR. No known commercial water conformance polymer is known to have this property.

TABLE 5

Water to Oil Ratio Summary
Control
Commercial Ester-Containing Polymer

|  | Water Rate at 100 psi | Oil Rate at 100 psi | Water-to-oil ratio |
|---|---|---|---|
| Initial | 26.21 | 12.4 | 2.11 |
| After Treatment | 1.08 | 3.63 | 0.3 |
| Final after 48 hrs. | 0.86 | 3.63 | 0.24 |
| % Permeability Change | 96.7% | 70.7% | 88.62% |

Table 5 shows that a commercial ester-containing control polymer reduces the water rate by about 97% while reducing the oil permeability by about 89%. The polymers of this invention clearly effect the oil permeability much less than this commercial ester-containing polymer.

Although this invention has been described in detail for the purpose of illustration, it is to be understood that such detail is solely for that purpose and that numerous modifications, alterations and changes can be made therein by those skilled in the art without departing from the spirit and scope of the invention except as it may be limited by the claims. All changes which come within the meaning and range of equivalency of the claims are to be embraced within their scope.

What is claimed is:

1. A water-soluble branched polyhydroxyetheramine, wherein the branched polyhydroxyetheramine is prepared by reacting an amine having two reactive hydrogen atoms with a diepoxide to form a polyhydroxyetheramine and then reacting the polyhydroxyetheramine with an N-alkylating agent.

2. The water-soluble branched polyhydroxyetheramine of claim 1 wherein the amine having two reactive hydrogen atoms is selected from the group consisting of amines of formula (a)–(g)

  (a)

  (b)

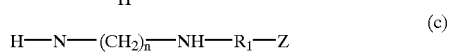  (c)

  (d)

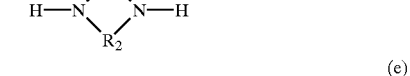  (e)

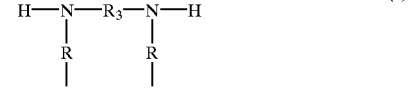  (f)

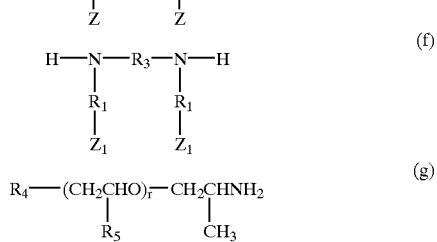  (g)

wherein
R is $C_2$–$C_{10}$ alkylene, optionally substituted with one or more hydroxy or hydroxyalkyl groups;

$R_1$ is independently selected at each occurrence from a group of formula $(-CH_2-CH_2-O-)_p$ and a group of formula

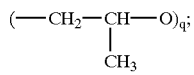

$R_2$ is $C_2$–$C_{10}$ alkylene, optionally substituted with alkylamido, hydroxy, alkoxy, halo, cyano, dialkylamine, aryloxy, alkylcarbonyl or arylcarbonyl;

$R_3$ is $C_2$–$C_{20}$ alkylene optionally substituted with alkylamido, hydroxy, alkoxy, halo, cyano, aryloxy, alkylcarbonyl or arylcarbonyl;

$R_4$ is alkoxy;

$R_5$ is H or $-CH_3$;

Z is hydrogen, alkylamido, hydroxy, dialkylamine, alkoxy, halo, aryoxy, cyano, alkylcarbonyl, or arylcarbonyl;

$Z_1$ is hydrogen, $C_1$–$C_7$ alkyl or acyl; and n, p, q and r are independently integers of 1 to about 45.

3. The water-soluble branched polyhydroxyetheramine of claim 1 wherein R is methylene or ethylene; $R_2$ is ethylene; $R_3$ is $C_2$–$C_{20}$ alkylene optionally substituted with alkylamido, dialkylamino, hydroxy or alkoxy; and Z is alkylamido, dialkylamino, hydroxy or alkoxy.

4. The water-soluble branched polyhydroxyetheramine of claim 1 wherein the amine is selected from the group consisting of methylamine; ethylamine; propylamine; butylamine; sec-butylamine; isobutylamine; 3,3-dimethylbutylamine; hexylamine; benzylamine; 2-amino-1-butanol; 4-amino-1-butanol; 2-amino-2-methyl-1-propanol; 6-amino-1-hexanol; ethanolamine; propanolamine; tris(hydroxymethyl)aminomethane; 1-amino-1-deoxy-D-sorbitol; 3-amino-1,2-propanediol; 2-amino-2-methyl-1,3-propanediol; 2-amino-2-ethyl-1,3-propanediol; 3-(dimethylamino)propylamine; N,N-dimethylethylenediamine, N,N-diethylethylenediamine; 1-(2-aminoethyl)piperidine; 4-(2-aminoethyl)morpholine; 2-(2-aminoethyl)-1-methylpyrrolidine; 1-(2- aminoethyl)pyrrolidine; 2-(2-aminoethyl)pyridine; 2-(2-aminoethoxy)ethanol; 2-(2-aminoethylamino)ethanol; piperazine, 2-methylpiperazine, 2,6-dimethylpiprazine; 2-(methylamido)piperazine; N,N'-bis(2-hydroxyethyl)ethylenediamine, N,N'-dimethylethylenediamine, N,N'-dimethyl-1,4-phenylenediamine and N,N'-dimethyl-1,6-hexanediamine.

5. The water-soluble branched polyhydroxyetheramine of claim 1 wherein the diepoxide is selected from the group consisting of diglycidyl esters of diacids, diglycidyl ethers of diols and epoxidized olefins.

6. The water-soluble branched polyhydroxyetheramine of claim 1 wherein the diepoxide is selected from the group consisting of diglycidyl ether of dimer acid, bis(2,3-epoxypropyl)ether, diglycidyl ether of 1,4-butanediol, diglycidyl ether of neopentyl glycol, diglycidyl ether of ethylene glycol, glycerol diglycidyl ether, diglycidyl ether of polyethyleneglycols, diglycidyl ether of polypropylene glycols, diglycidyl ether of glycols from the reaction of ethylene oxide with propylene oxide, diglycidyl ether of cyclohexane dimethanol, 1,2,3,4-diepoxybutane; 1,2,7,8-diepoxyoctane, 1,2,9,10-diepoxydecane and 1,2,5,6-diepoxycyclooctane.

7. The water-soluble branched polyhydroxyetheramine of claim 1 wherein the N-alkylating agent is selected from the group consisting of halogen-containing polyalkoxides, alkyl halides, alcohol sulfonates and alpha olefin sulfonates.

8. The water-soluble branched polyhydroxyetheramine of claim 1 wherein the N-alkylating agent is a halogen containing polyalkoxide.

9. The water-soluble branched polyhydroxyetheramine of claim 1 wherein the polyhydroxyetheramine is further reacted with an amine having one or two reactive hydrogen atoms.

10. The water-soluble branched polyhydroxyetheramine of claim 1 wherein one or more aliphatic triepoxides are added simultaneously with the diepoxide.

11. A water-soluble branched polyhydroxyetheramine according to claim 1 selected from the group consisting of diethanolamine capped ethanolamine/diglycidyl ether of neopentyl glycol copolymer grafted with epichlorohydrin terminated polyethyleneglycol methyl ether;

N,N,N'-trimethyl-1,3-propanediamine capped ethanolamine/3-(dimethylamino)propylamine/diglycidyl ether of neopentyl glycol terpolymer grafted with epichlorohydrin terminated polyethyleneglycol methyl ether polymer;

diethanolamine capped 3-(dimethylamino)propylamine/ethanolamine/poly(ethylene glycol)diglycidyl ether terpolmer grafted with epichlorohydrin terminated polyethyleneglycol methyl ether; and diethanolamine capped 3-(dimethylamino)propylamine/ethanolamine/ethylene glycol diglycidyl ether terpolymer grafted with epichlorohydrin terminated polyethyleneglycol methyl ether.

12. An aqueous composition comprising from about 0.005 percent to about 2 percent, by volume, of a water-soluble branched polyhydroxyetheramine, wherein the branched polyhydroxyetheramine is prepared by reacting an amine having two reactive hydrogen atoms with a diepoxide to form a polyhydroxyetheramine and then reacting the polyhydroxyetheramine with an N-alkylating agent.

13. A method of modifying the permeability to water of a subterranean formation comprising injecting into the subterranean formation an aqueous composition comprising from about 0.005 percent to about 2 percent, by volume, of a water-soluble branched polyhydroxyetheramine, wherein the branched polyhydroxyetheramine is prepared by reacting an amine having two reactive hydrogen atoms with a diepoxide to form a polyhydroxyetheramine and then reacting the polyhydroxyetheramine with an N-alkylating agent.

14. A method in a fracture-stimulation treatment of modifying the permeability to water of a subterranean formation comprising injecting into the subterranean formation an aqueous composition comprising a mixture of an N-alkylating agent and a polyhydroxyetheramine backbone polymer as a preflush ahead of a fracture-stimulation treatment before these components can react.

15. A method in a fracture-stimulation treatment of modifying the permeability to water of a subterranean formation comprising injecting into the subterranean formation an aqueous composition comprising a mixture of an N-alkylating agent and polyhydroxyetheramine backbone polymer prepared from the reaction of an amine with two reactive hydrogen with a diepoxide as a preflush ahead of the fracture-stimulation treatment before these components can react.

* * * * *